United States Patent
Comstock

(10) Patent No.: US 9,467,916 B2
(45) Date of Patent: Oct. 11, 2016

(54) INCREMENTAL COMPENSATION COMMUNICATION STATION COVERAGE AREA EXPANSION UTILIZING AVAILABLE FREQUENCY CHANNELS

(71) Applicant: KYOCERA Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/456,729

(22) Filed: Aug. 11, 2014

(65) Prior Publication Data

US 2015/0045034 A1    Feb. 12, 2015

Related U.S. Application Data

(60) Provisional application No. 61/864,474, filed on Aug. 9, 2013.

(51) Int. Cl.

| | |
|---|---|
| H04W 36/08 | (2009.01) |
| H04W 36/16 | (2009.01) |
| H04W 52/02 | (2009.01) |
| H04W 52/34 | (2009.01) |
| H04L 12/26 | (2006.01) |
| H04W 72/04 | (2009.01) |

(52) U.S. Cl.
CPC .......... *H04W 36/165* (2013.01); *H04L 43/062* (2013.01); *H04L 43/16* (2013.01); *H04W 52/0209* (2013.01); *H04W 52/34* (2013.01); *H04W 52/346* (2013.01); *H04W 72/0486* (2013.01); *Y02B 60/50* (2013.01)

(58) Field of Classification Search
CPC ... H04W 36/00; H04W 36/10; H04W 36/08; H04W 36/16; H04W 36/22; H04W 36/30; H04W 36/24

USPC ................ 455/436, 438, 439, 442, 443, 444
See application file for complete search history.

(56) References Cited

U.S. PATENT DOCUMENTS

| | | | |
|---|---|---|---|
| 8,509,135 B2 * | 8/2013 | Kwun | H04W 52/0235 370/311 |
| 2011/0158190 A1 * | 6/2011 | Kuwahara | H04B 7/0617 370/329 |
| 2011/0269451 A1 * | 11/2011 | Liu | H04W 48/12 455/422.1 |
| 2013/0095842 A1 * | 4/2013 | Jia | H04W 28/16 455/452.1 |

(Continued)

FOREIGN PATENT DOCUMENTS

| | | |
|---|---|---|
| JP | 2006352477 A | 12/2006 |
| JP | 5584309 B2 | 7/2014 |

(Continued)

OTHER PUBLICATIONS

International Search Report and Written Opinion issued Jan. 27, 2015 in PCT/IB2014/001942.

*Primary Examiner* — Kevin Kim

(57) ABSTRACT

In a cellular communication system, a coverage area configuration transition includes expanding the coverage of a compensation service area, utilizing one or more carriers that are not being utilized by an energy saving service area. Once all of the user equipment devices (UE devices) being served by the energy saving service area are handed over, the energy saving service area may be deactivated. In some case, the UE devices are handed over in stages, which incrementally reduces the energy consumed by the energy saving service area.

19 Claims, 5 Drawing Sheets

(56) References Cited

U.S. PATENT DOCUMENTS

| | | | |
|---|---|---|---|
| 2013/0130690 A1* | 5/2013 | Hunukumbure | H04W 36/22 455/436 |
| 2013/0223317 A1 | 8/2013 | Kudo | |
| 2014/0018077 A1* | 1/2014 | Zhong | H04W 52/0206 455/436 |
| 2014/0038598 A1* | 2/2014 | Ren | H04W 48/16 455/434 |
| 2014/0051446 A1* | 2/2014 | Rose | H04W 36/165 455/436 |
| 2014/0126410 A1* | 5/2014 | Agarwal | H04W 24/02 370/252 |

FOREIGN PATENT DOCUMENTS

| | | |
|---|---|---|
| WO | 2010110187 A1 | 9/2010 |
| WO | 2012063834 A1 | 5/2012 |

* cited by examiner

INCREMENTAL COMPENSATION COMMUNICATION STATION COVERAGE AREA EXPANSION UTILIZING AVAILABLE FREQUENCY CHANNELS

CLAIM OF PRIORITY UNDER 35 U.S.C. §119

The present application claims priority to Provisional Application No. 61/864,474, entitled "Methods for Managing Resources for Transitions Between Cell Coverage Configurations", filed Aug. 9, 2013, assigned to the assignee hereof, and hereby expressly incorporated by reference.

FIELD

This invention generally relates to wireless communications and more particularly to apparatuses, systems, and methods for expanding a compensation communication station coverage area using one or more available carriers.

BACKGROUND

Many wireless communication systems employ transceiver stations or radio heads to provide service within geographical service areas, where the boundaries of a service area are determined by the radio coverage of its associated transceiver station. Wireless service is provided to user equipment (UE) devices over radio frequency carriers (carriers) within each service area, where a carrier is the modulated waveform that conveys the physical channels as specified by the associated wireless technology standard. These service areas are sometimes referred to as "cells".

Although the term "cell" sometimes refers to the geographical area where multiple uplink and downlink resources (e.g., pairs of uplink and downlink carriers) are used, increasingly the term "cell" is used to refer to the geographical service area where single uplink resource and a single downlink resource are used to communicate with the UE devices. For example, where Time Division Duplex (TDD) is used, a single frequency may be used for uplink and downlink at different times within the "cell". Where Frequency Division Duplex (FDD) is used, a single uplink/downlink frequency pair (one uplink frequency and one downlink frequency) is used within a "cell".

As discussed herein, one or more resources (carrier pairs) may be used in a service area. As a result, a service area may be a single cell or may contain multiple cells. In one common arrangement, each service area is adjacent to several other service areas to provide ubiquitous coverage over a large geographical area.

Adjacent service areas may overlap slightly, but, for the following discussion, no service areas provide service within the same geographical area. In many situations, there may be an advantage to dynamically change the configuration of the service areas, such as by selectively reducing the size of some service areas and expanding the size of one or more other service areas to provide service within the area previously serviced by the service areas that were reduced. Such dynamic coverage area configuration transitions may allow for more efficient operation of the system.

For example, a service area with only a small number of UE devices may be reduced to zero by deactivating its associated transceivers, and an adjacent service area that is serving several UE devices but has available capacity may be expanded to provide radio coverage for the UE devices previously contained in the reduced service area. Therefore, a service area that is reduced may be referred to as an energy saving service area since the energy consumed by its associated transceivers is reduced or eliminated, and a service area that is reduced to zero may be referred to as a deactivated service area. A service area that is expanded in cooperation with a service area that is reduced may be referred to as compensation service area since its service area is expanded to compensate for a service area that is reduced.

UE devices being served by an energy saving service area may lose their connection with the network if they are not handed over to another service area before the energy saving service area is deactivated. If the energy saving service area and the compensation service area operate on the same frequency resources, UE devices being served by an energy saving service area may lose their connection with the network if the compensation service area is expanded before the UE devices are handed over to another service area because of the interference between the energy saving service area and the compensation service area. As discussed below, management techniques are needed to control the dynamic coverage area configuration transitions.

SUMMARY

In a cellular communication system, a coverage area configuration transition is performed when it is determined that an energy saving communication station should reduce or deactivate its service area. Initially, the compensation service area and the energy saving service area operate with the same set of carriers. When the traffic load of the energy saving service area decreases, the number of carriers it operates can be reduced. In reconfiguring the coverage areas of the system, one or more carriers that are not in use in the energy saving service area are utilized to expand the area covered by the compensation service area to cover at least a portion of an energy saving service area of an energy saving cell. The one or more carriers utilized to expand the coverage area of the compensation coverage area will not interfere with the UE devices operating within the energy saving service area and some of these UE devices are handed over to these one or more carriers of the compensation cell. Handing over the UE devices from the energy saving cell to the compensation cell further reduces the traffic load in the energy saving service area, which facilitates reducing the energy consumption of the energy saving service area. In some cases, all of the UE devices from the energy saving cell are handed over, and the energy saving cell may be deactivated or switched off. In other cases in which some, but not all, of the UE devices are handed over from the energy saving cell, the traffic load of the energy saving cell is further reduced, which allows the compensation cell to utilize an additional one or more carriers to receive additional UE devices being handed over from the energy saving cell. This process can be repeated until all of the UE devices are handed over from the energy saving cell. In this manner, the UE devices can be handed over in stages until the energy saving service area can be deactivated entirely. An energy saving communication station providing the energy saving cell is configured to at least manage the number of carriers operating in the energy saving service area based on the traffic load, to coordinate the energy saving service area frequency carrier usage with the compensation communication station, to coordinate the expansion of a compensation serving area for a carrier, including sending an expansion notification to a compensation communication station providing the compensation service area, where the notification at least indicates that the compensation service area can be expanded.

DETAILED DESCRIPTION

Figure 1:
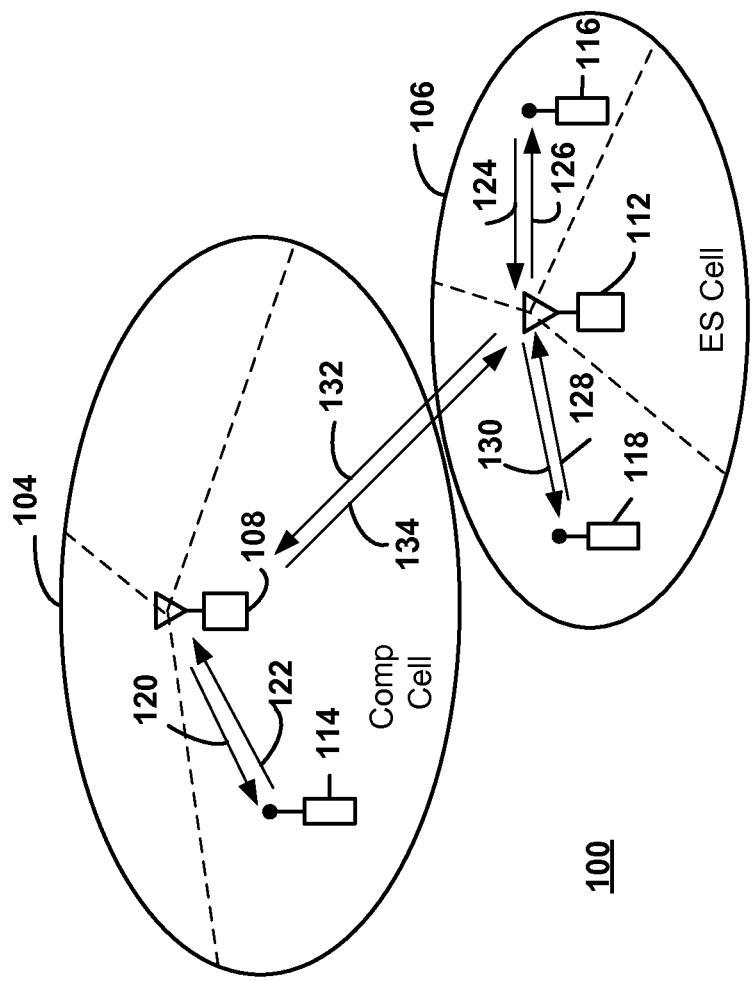
FIG. 1 is an illustration of coverage areas in a cellular communication system.

In a cellular communication system, a coverage area configuration transition is performed when it is determined that an energy saving communication station should reduce or deactivate its service area. In reconfiguring the coverage area of the system, the compensation service area (e.g., compensation communication station coverage area) is expanded to include at least a portion of an area covered by the energy saving communication station. For example, the expanded compensation service area would cover an energy saving service area of an energy saving cell and the energy saving service area is deactivated. Interference between the transmissions from the energy saving communication station and the transmissions from the compensation communication station is avoided by configuring the compensation communication station to utilize one or more carriers that are not being utilized by the energy saving communication station. For the purpose of illustration, initially, the compensation service area and the energy saving service areas do not overlap and they both operate the same set of two or more frequency channels. Interference is avoided since the service areas do not overlap. When the traffic load of the energy saving service area decreases, the energy saving communication station may reduce the number of frequency carriers operating in an energy saving service area and notify a compensation communication station about the change in the frequency channel usage in the energy saving service area. If the available resource capacity of the compensation serving area is sufficient, the compensation communication station may expand the coverage of the compensation service area frequency carrier that corresponds to the frequency channel no longer operated within the energy saving service area, such that the coverage of this frequency carrier includes at least a part of the energy saving service area. The compensation frequency carrier with the expanded coverage will not interfere with the UE devices in the energy saving service area and UE devices being served within the energy saving service area may be handed over to the expanded compensation service area frequency carrier. The number of energy saving UE devices that may be handed over to this compensation serving area frequency carrier is constrained by the available resource capacity of the compensation serving area. When the traffic load of the energy saving service area decreases further, the number of operating frequency carriers may be further reduced and the coverage of additional frequency carriers of a compensation service area may be expanded to cover at least a part of the energy saving service area. At a point in time, the traffic loads of the energy saving service area and the compensation service area may allow all of the UE devices within the energy saving service area to be handed over and the energy saving service area may be deactivated, which provides the largest savings in energy consumption. Before this time, energy consumption savings may be obtained incrementally as the resource requirements of the energy saving service area decreases. Although frequency carrier resources are referred to herein, other resources used in communication systems may be applied as well, such as OFDMA subchannels, and radio protocol frame timeslots.

FIG. 1 is an illustration of coverage areas in a cellular communication system 100 where coverage area transitions are managed using delayed handovers. For the example of FIG. 1, an energy saving communication station provides wireless service within a geographical service area represented by a circular area of an energy saving cell and a compensation communication station provides wireless service within a geographical service area represented by a circular area of a compensation cell. In typical implementations of the cellular communication system 100, several adjacent cells cover larger geographical regions. In the interest of brevity and clarity, however, FIG. 1 shows only two cells 104, 106. The circular shapes representing the service areas of the cells generally illustrate the relationships between the cells and do not necessarily depict the actual shapes of the service areas. The coverage area configuration transition management techniques discussed with reference to FIG. 1 may be applied to numerous coverage area configuration transition scenarios. For example, several energy saving cells may be deactivated and a compensation cell may be expanded to cover the geographical service areas of the multiple energy saving cells in accordance with the techniques discussed herein. The cells may have any of several shapes and sizes.

Communication stations 108, 112 transmit and receive wireless signals to provide the cells 104, 106. Each communication station 108, 112, which also may be referred to as an access node, access point, eNodeB, eNB, base station, and other terms, includes a transceiver and station controller. For the embodiments described herein, the station controller in each communication station is configured to perform the various methods and operations of the embodiments. The transceiver, or radio head, is typically collocated with the station controller although, in some situations, the station controller may be physically separated from the radio head. The radio head at least includes radio frequency (RF) transceiver equipment such as antennas, transmitters, and receivers, for transmitting and receiving wireless signals. Typically, radio heads do not include higher level processing and control functions which are performed by the associated station controller. For the illustration of FIG. 1, the radio heads are near a station controller where both the radio head and the controller may be implemented within a single apparatus. Since the location, shape, and size of the cell is determined at least in part by wireless transmission and reception with the communication station, the cell's location and coverage area is determined by the location and operation of the radio head. The compensation communication station 108 provides the compensation cell 104 and an energy saving communication station 112 provides the energy saving cell 106. Each communication station 108, 112, therefore, provides wireless communication services to wireless communication user equipment devices (UE devices) 114, 116, 118 within the cell where each cell covers a geographical service area. Communication stations typically provide several cells, but in the interest of brevity and clarity, communication stations 108 and 112 each provide one cell and the full radio and data processing capacity of communication stations 108 and 112 are applied to the service of the cell they provide. Accordingly, the available capacity of a cell is equivalent to the available capacity of the communication station that provides the cell. As discussed herein, a communication station includes the equipment such as a station controller and radio head that provides a single cell. Accordingly, a communication station can be configured or adjusted to establish the size and shape of the service area of the cell. Several communication stations are typically interconnected through a backhaul (not shown) and to a network (not shown) to provide several service areas to cover large areas. The backhaul may include any combination of wired, optical, and/or wireless communication channels. For the examples herein, the network includes the functionality of the Mobility Management Entity (MME) and the Packet Gateway (P-GW).

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

Therefore, for the examples herein, the compensation communication station 108 includes a wireless transceiver that transmits downlink signals 120 to one or more UE devices 114 within the compensation cell 104 in accordance with 3GPP LTE and receives uplink signals 122 from one or more UE devices 114 within the compensation cell 104 in accordance with 3GPP LTE. The energy saving communication station 112 includes a wireless transceiver that transmits downlink signals 126 and 130 to one or more UE devices 116, 118 within the energy saving cell 106 in accordance with 3GPP LTE and receives uplink signals 124 and 128 from one or more UE devices 116, 118 within the energy saving cell 106 in accordance with 3GPP LTE.

The User Equipment (UE) devices 114, 116, 118 may be referred to as mobile devices, wireless devices, wireless communication devices, and mobile wireless devices, and UEs, as well as by other terms. The wireless communication devices include electronics and code for communicating with communication stations (eNBs) and, in some cases, with other devices including other UE devices. The UE devices include devices such as smart phones, cell phones, personal digital assistants (PDAs), wireless modem cards, wireless modems, televisions with wireless communication electronics, and laptop and desktop computers, as well as other devices. The combination of wireless communication electronics with an electronic device, therefore, may form a wireless communication device. For example, a wireless communication device may include a wireless modem connected to an appliance, computer, or television.

The compensation communication station 108 uses the same set of two or more frequency channels to provide the compensation cell 104 as the energy saving communication station uses to provide the energy saving cell 106. For the example of FIG. 1, the same set of downlink/uplink frequency channel pairs are assigned for the compensation cell 104 and the energy saving cell 106. In the cell configuration shown in FIG. 1, communications in the compensation cell 104 do not interfere with communications in energy saving cells 106 since the service areas of the cells do not overlap. As discussed below, when the coverage of a frequency carrier of a compensation service area is expanded, it will not interfere with the UE devices served by the energy saving cell. As described below, the coverage area transitions are managed to avoid or at least minimize interference.

First, the compensation communication station 108 receives an indication 132 that the energy saving communication station 112 is not using one or more carriers. In some instances, the compensation communication station 108 receives the indication 132 during X2 setup and eNB Configuration Update, according to 3GPP LTE. In other situations, the compensation communication station 108 receives the indication 132 when the energy saving communication station 112 notifies the compensation communication station 108 that the energy saving communication station 112 is no longer using one or more carriers. The energy saving communication station 112 may transmit the indication 132 wirelessly or over a wired connection.

The energy saving communication station 112 may send the indication 132 that the energy saving communication station 112 is no longer using one or more carriers as a result of a reduction in traffic load of the energy saving communication station 112. The reduction in traffic load allows the energy saving communication station 112 to reduce the number of carriers utilized to serve the UE devices 116, 118 in the energy saving cell 106. As used herein, the term "traffic load" generally refers to an amount of communications resources of a particular communications station that are being used by the UE devices that are being served by the communications station. Traffic load can be expressed in an absolute terms or as a measurement relative to the total resources (e.g., capacity) of the communications station.

If the compensation communication station 108 has available capacity to serve one or more of the UE devices 116, 118 being served by the energy saving communication station 112, the compensation communication station 108 selects one or more of the carriers whose frequency channel is not being used by the energy saving communication station 112 and sends a notification 134 to the energy saving communication station 112 of which of the one or more carriers has been selected.

Utilizing the selected one or more carriers, a first compensation communication station coverage area (e.g., compensation cell 104) is expanded to include at least a portion of an area (e.g., energy saving cell 106) covered by the energy saving communication station 112. More specifically, the energy saving communication station 112 prepares the compensation communication station 108 to expand the compensation cell 104 such that the compensation communication station 108 utilizes the selected one or more carriers for at least the expanded area. After one or more UE devices have been handed over from the energy saving service area, the energy saving cell 106 may reduce the amount of energy being used by the energy saving cell 106. In general, for a complete coverage configuration transition, all of the UE devices being served by the energy saving cell are handed over to one or more compensation cells (or neighboring cells that do not expand their coverage area) before the energy saving cell reduces the amount of energy being used. However, in other instances, the energy saving cell may hand over one or more UE devices and still continue to serve one or more remaining UE devices. When the energy saving cell hands over all of its UE devices, the reduction of energy will generally include switching off or deactivating the energy saving cell 106. In other circumstances, the reduction of energy could include: reducing the size of the service area being served by the energy saving cell 106, reducing the broadcast strength of the signals 126, 130 being transmitted by the energy saving communication station 112, and/or reducing the number of UE devices being served by the energy saving cell 106.

In some situations, the energy saving communication station 112 may utilize multiple handover stages to handover the UE devices 116, 118 to one or more compensation communication stations. For example, after completing a first handover stage, as described above, the energy saving communication station 112 may transmit an additional indication 132 to the compensation communication station 108 that the energy saving communication station 112 is not using an additional one or more carriers because of a decrease in its traffic load, possibly due to handing over at least one of the UE devices 116, 118 from the energy saving communication station 112 to the compensation communication station 108. If the compensation communication station 108 has available capacity to serve one or more of the UE devices 116, 118 being served by the energy saving communication station 112, another handover stage is executed, as described above, using another compensation service area frequency carrier, which is not being used by the energy saving cell, to expand the coverage area of the compensation cell. This process of using multiple handover stages can repeatedly continue until all of the UE devices 116, 118 of a particular energy saving communication station 112 are handed over.

Figure 2:
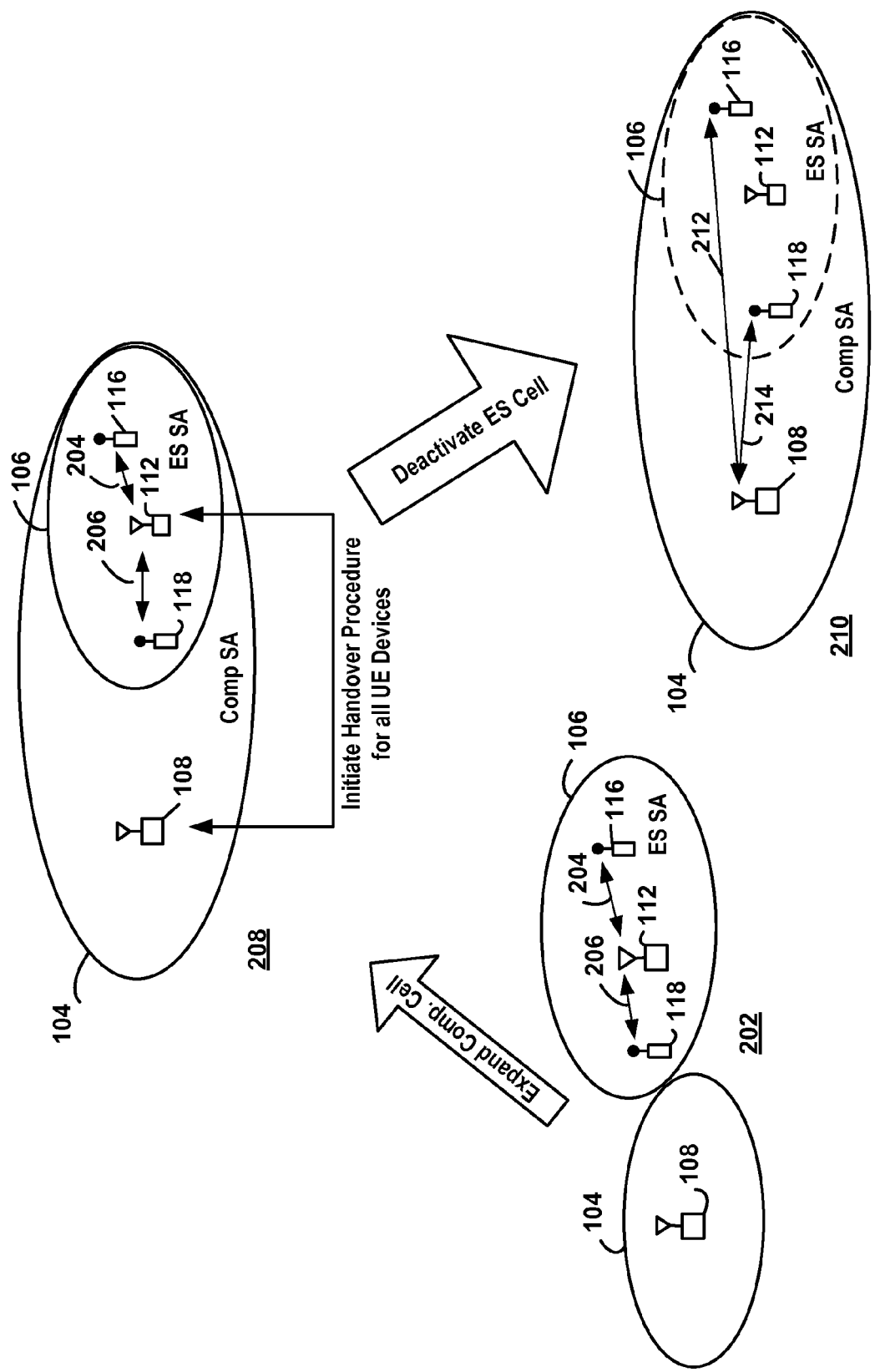
FIG. 2 is an illustration of a coverage transition where the energy saving service area (ES SA) is deactivated and the compensation service area (Comp. SA) is expanded to provide wireless service within the geographical region of the energy saving service area.

FIG. 2 is an illustration of a coverage transition where the energy saving service area (ES SA) 106 is deactivated and the compensation service area (Comp. SA) 104 is expanded to provide wireless service within the geographical region of the energy saving service area 106. In the example of FIG. 2, a coverage transition within the system of FIG. 1 is shown progressing through three stages. In the interests of clarity and brevity, two UE devices 116, 118, are shown in the example.

In the first stage 202, the UE devices 116, 118 are communicating over wireless communication links 204, 206 with the communication station 112 of the energy saving service area 106. For the example, the UE devices 116, 118 are at least receiving control signals and may also be transmitting control signals and exchanging data with the communication station 112 prior to the coverage transition. The coverage transition may be initiated in response to a determination that the energy saving service area 106 should be deactivated and the compensation service area 104 should be expanded. Such a determination may be based on any number of several factors and circumstances where some examples include the resource load on the energy saving service area 106 and the compensation service area 104. The resource load of a service area is based on the amount of time and frequency resources being used by all of the UE devices 116, 118 within the service area. The determination for deactivating the energy saving service area 106 may be based on whether the resources allocated to the compensation service area 104 have sufficient available capacity to provide service to the UE devices 116, 118 within the ES service area 106. The determination for initiating a coverage configuration transition, may be based on the compensation communication station receiving an indication from an energy saving communication station that the energy saving service area is not using a frequency channel that is supported by the compensation service area and the associated frequency carrier of the compensation service area has sufficient available capacity to provide service to the UE devices 116, 118 within the ES service area 106. As another example, the determination for deactivating an energy saving service area 106 may be based on a particular time, day, month, etc., where an operator has determined that the traffic load at this time can be managed without the energy saving service area 106. In response to the determination that the energy saving service area 106 should be deactivated, the coverage transition is initiated.

When the compensation communication station 108 receives an indication of an available carrier for compensation service area expansion and determines that the compensation cell's traffic load may be sufficiently low to allow the compensation cell to serve one or more of the UE devices of the energy saving cell 106, the compensation communication station 108 sends a message to the energy saving communication station 112 to request a cell coverage configuration transition. The energy saving communication station 112 sends a response message that indicates whether the request is accepted or not. For the purpose of this illustration, the cell coverage configuration transition would consist of the expansion of the coverage area 104 of the compensation cell, using one or more of the carriers not being used by the energy saving cell, to include at least part of the energy saving coverage area 106 and may include the deactivation of the energy saving service area 106 if all of its UE devices may be handed over to other cells.

When the compensation communication station 108 receives a response message from the energy saving communication station 112 with an "accept" indication, the coverage transition may be initiated, which is the second stage 208. The compensation communication station 108 initiates the expansion of the compensation service area and the energy saving communication station 112 initiates the handover procedures for the UE devices 116, 118 currently receiving wireless service from the energy saving communication station 112. The UE devices 116, 118 are handed over from the energy saving cell to other cells according to the typical LTE handover procedures. A UE device 116, 118 may be handed over to the compensation cell 104 when the compensation cell's coverage of the energy saving service area 106 allows it to be a suitable handover target for the UE.

After the compensation cell carrier expansion is complete, the compensation communication station 108 notifies the energy saving communication station 112. After the energy saving communication station 112 receives notification that the compensation cell expansion is complete and all of the UE devices 116, 118 are handed over to other cells, at the third stage 210 of the transition procedure, the energy saving service area 106 is deactivated. The circle representing the energy saving service area 106 is shown with a dashed line to indicate that the cell is no longer active. As a result, the energy saving communication station (eNB) 112 does not provide wireless service within the energy saving service area 106 by transmitting or receiving wireless signals. For the example herein, the energy saving communication station 112 is turned off and consumes little or no power, and the UE devices 116, 118 are communicating over wireless communication links 212, 214 with the compensation communication station 112 of the expanded compensation service area 104.

Figure 3:
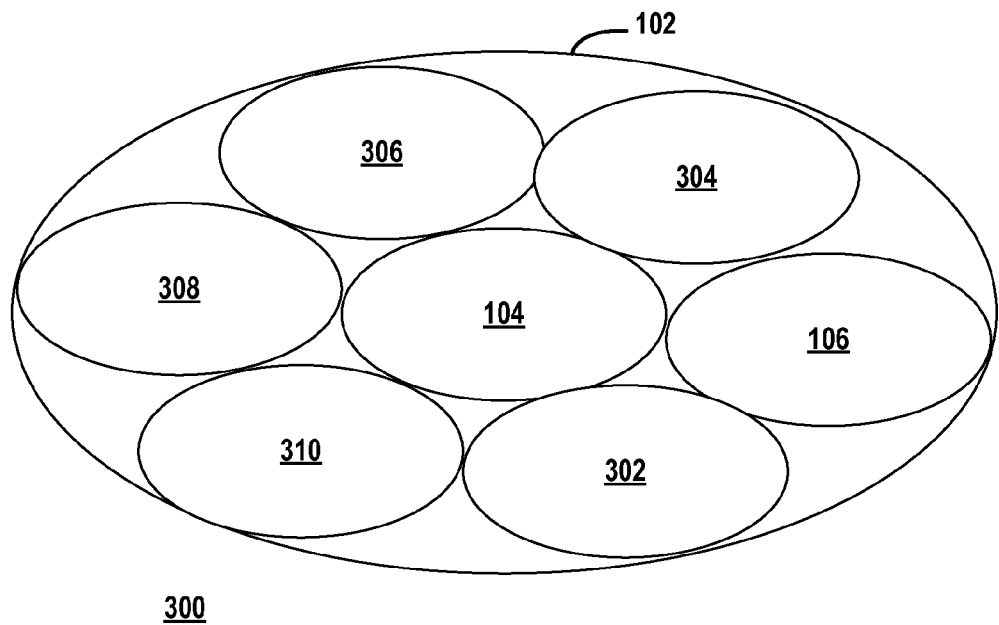
FIG. 3 includes illustrations of a coverage area transition where the compensation service area is expanded to cover more than one energy saving service area.
Figure 3:
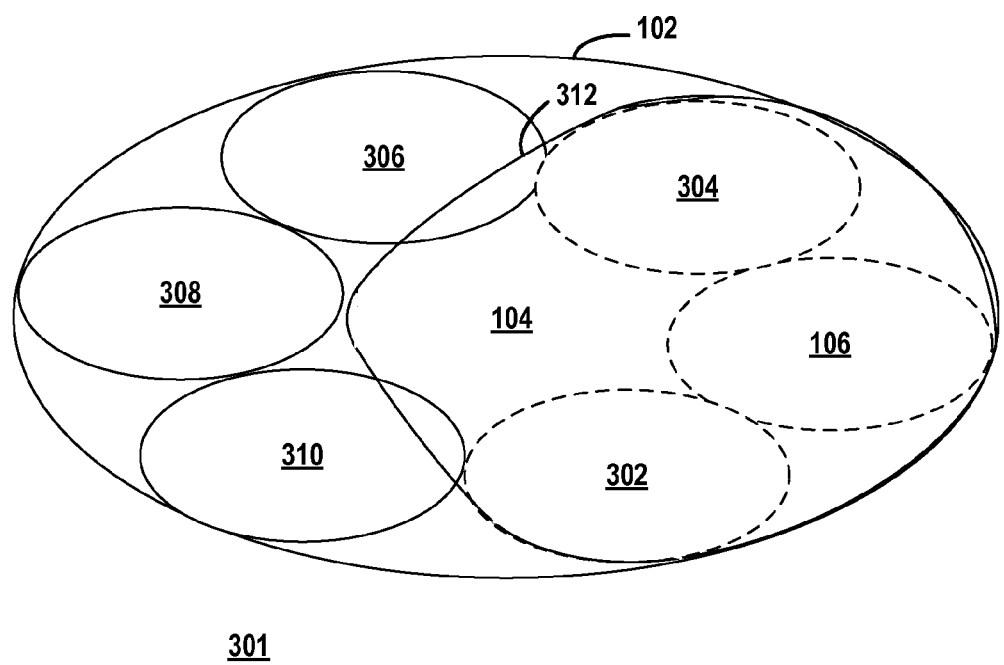

FIG. 3 includes illustrations 300, 301 of a coverage area transition where the compensation service area is expanded to cover more than one energy saving service area. The circular shapes representing the service areas generally illustrate the relationships between the service areas and do not necessarily depict the actual shapes of the service areas. In addition, the service areas may overlap in some regions more than in other regions. The open areas shown between the circular shaped service areas in the figure do not necessarily indicate that no service is available in these areas and are merely a product of illustration utilizing simple shapes to represent a more complicated relationship between service areas. Further, the service areas may contain holes of coverage where service is unavailable. In the interests of clarity and brevity, such features are not illustrated in the figures.

For the example of FIG. 3, the region 102 includes the geographical areas of several smaller service areas 104, 106, 302, 304, 306, 308, 310 including the compensation service area 104 and three energy saving service areas 106, 302, 304. In state 300 before the compensation area is expanded, the energy saving service areas 106, 302, 304 have coverage areas adjacent to the compensation service area 104. In state 301 after the compensation service area is expanded, the compensation service area 312 has a coverage area that includes the original coverage area of the compensation service area 104 and at least portions of the coverage areas of the energy saving service areas 106, 302, 304. The expanded compensation service area 312, therefore, is the compensation service area 104 with a larger coverage area. The energy saving service areas are shown with dashed lines in the coverage state 301 to illustrate that the service areas have been deactivated. The coverage area transition procedure for multiple energy saving service areas is similar to the transition procedure for a single energy saving service area discussed above. In one example, the compensation service area expands to cover each energy saving service area serially. In other words, the compensation service area is expanded to cover a first energy saving service area before a second energy service area. In such an example, all UE devices in the first energy saving service area are handed over to the compensation service area, the compensation service area is expanded to cover the first energy saving service area, and the UE devices are transferred to the compensation service area prior to the procedure being performed for next energy saving service area. In the examples discussed below, however, the compensation service area is expanded to cover multiple energy saving service area areas in a single coverage area transition procedure. In this example, all UE devices from all energy saving service areas are handed over to the compensation service area, the compensation service area is expanded, and all the UE devices complete the handovers to the compensation service area. In some circumstances, some UE devices may be transferred to neighboring small service areas (306, 310) instead of the compensation service area. In these instances, the small service areas 306, 310 may act as additional compensation communication stations and may remain the same size or may expand/reduce their respective compensation service areas, as needed.

In some situations, a first compensation service area (e.g., first compensation communication coverage area) is only expanded to cover a portion of the energy saving service area, and one or more additional compensation communication stations each expand their respective coverage areas to include any portion of the energy saving service area that is not covered by the expanded first compensation communication station coverage area.

Figure 4:
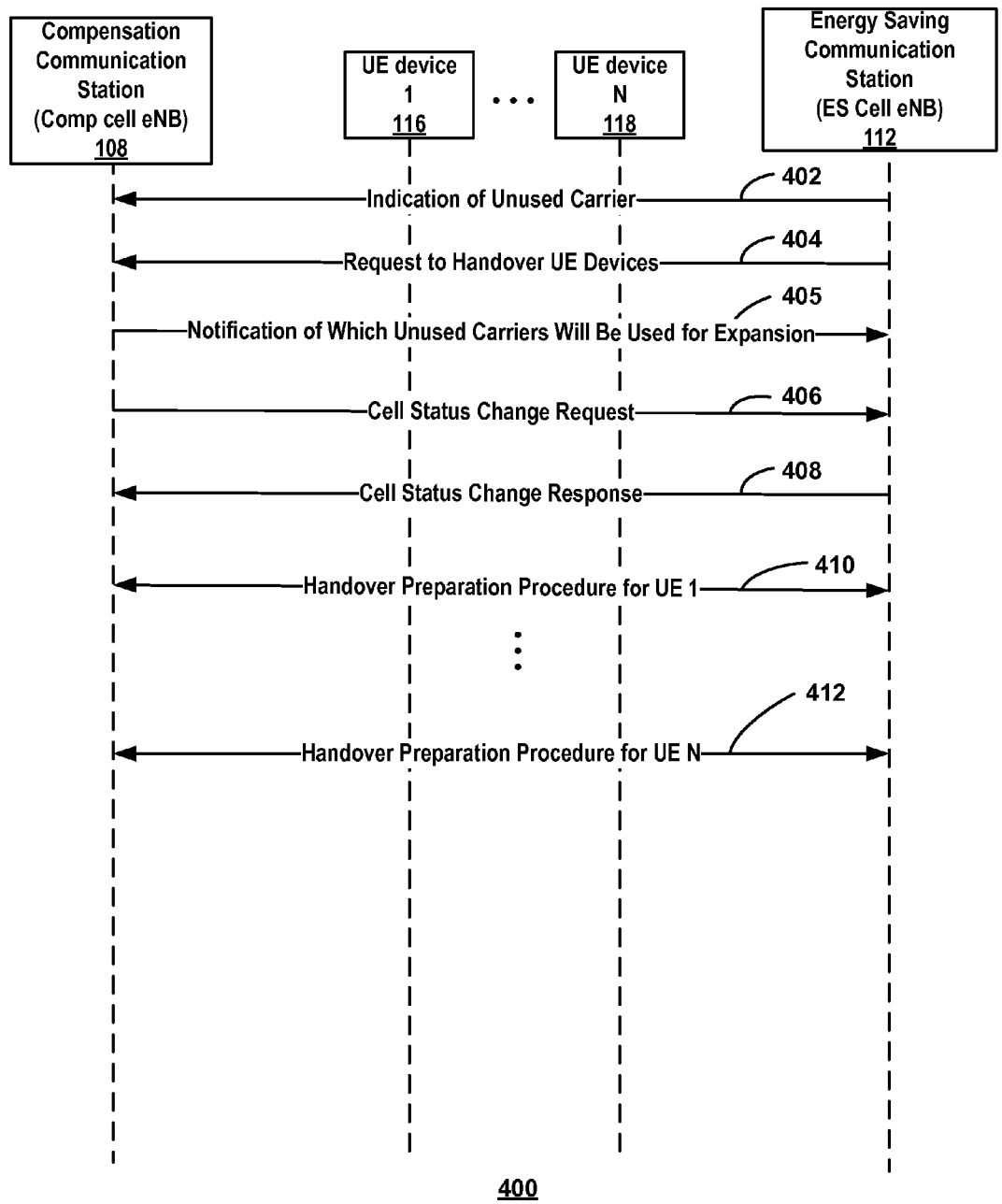
FIG. 4 is a message flow diagram between the compensation communication station, the energy saving communication station, and the UE devices.

FIG. 4 is a message flow diagram 400 between the compensation communication station 108, the energy saving communication station 112, and the UE devices 116, 118. For the example, the communication stations are eNBs that communicate through the backhaul over an X2 link in accordance with LTE communication standards. Other communication techniques can be used in some circumstances. More specifically, the communication stations could communicate wirelessly in some circumstances.

For the example shown in FIG. 4, the energy saving communication station (ES eNB) 112 sends an indication 402 to the compensation communication station (Comp cell eNB) 108 that the energy saving communication station 112 is not using one or more carriers such that the associated frequency channel may be used to expand a compensation service area. As described above, in some instances, the compensation communication station 108 receives the indication 402 during X2 setup and eNB Configuration Update, according to 3GPP LTE. In other situations, the compensation communication station 108 receives the indication 402 when the energy saving communication station 112 notifies compensation communication station 108 that the energy saving communication station 112 is no longer using one or more carriers. The energy saving communication station 112 may transmit the indication 402 wirelessly or over a wired connection.

The compensation communication station 108 receives a request 404 from the energy saving communication station 112 to handover one or more user equipment devices (UE devices) 116, 118 from the energy saving communication station 112 to the compensation communication station 108. The energy saving communication station 112 may send the handover request 404 as a result of determining that it should reduce its coverage area or deactivate. In some instances, the handover request 404 is transmitted as part of, or in addition to, a notification to the compensation communication station 108 that the traffic load of the energy saving communication station 112 is low enough to consider switching off the energy saving communication station 112. The energy saving communication station 112 may transmit the handover request 404 and/or notification wirelessly or over a wired connection. If the compensation cell 104 has sufficient resources available to serve one or more of the UE devices 116, 118 being served by the energy saving cell 106, the compensation communication station 108 selects one or more of the carriers not being used by the energy saving communication station 112 and sends a notification 405 to the energy saving communication station 112 of which of the one or more carriers has been selected.

If it is determined that the compensation communication station 108 can serve the UE devices 116, 118 being served by the energy saving cell, the compensation cell is reconfigured such that the coverage of one or more of its frequency carriers is expanded to include the coverage area being served by the energy saving cell. A Cell Status Change Request message 406 is sent by the compensation communication station 108 to the energy saving communication station 112 to request the initiation of a transition of the cell coverage configuration. The energy saving communication station 112 sends a Cell Status Change Response message 408 to the compensation communication station 108 accepting or rejecting the request to deactivate the energy saving cell. The Cell Status Change Response message 408 is an example of the Expansion Notification and indicates to the compensation communication station 108 that the compensation service area can be expanded. In one example, the Cell State Change messages 406/408 are part of a dedicated procedure for this feature that is added to a standard specification. In other circumstances, the Cell State Change messages 406/408 functions may be incorporated into messaging structures and procedures currently defined by a communication standard, such as the Load Management or eNB Configuration Update procedures contained in the LTE communication standard. In either case, modifications of the LTE communication standard can facilitate the communication.

The expansion of the carrier of the compensation service area is initiated by the compensation communication station 108 after receiving the Cell Status Change Response message 408 with an indication that the energy saving communication station 112 accepts the request to deactivate the energy saving cell. The compensation communication station 108 increases transmission power and performs other known techniques for expanding the compensation service area for the selected carrier to cover the energy saving service area. For example, techniques such as antenna tilting and antenna beam forming may be used to provide an expanded service area of the compensation cell that covers the original service area of the energy saving service area as well as the original service area of the compensation service area.

Where multiple energy saving service areas are deactivated the compensation service area is expanded to cover those service areas. In one example, the parameters for establishing the expanded coverage area are determined at the time of equipment deployment. For example, signal quality measurements may be made and the parameters may be determined using the signal measurements at the time of or after equipment installation. Accordingly, the compensation communication station applies stored values or values it has received from an Operations and Maintenance (OAM) system to expand the service area to cover the areas of the energy saving service areas that have been deactivated.

The UE devices 116, 118 are handed over from the energy saving cell to other cells according to the typical LTE handover procedures. A UE device may be handed over to the expanded carrier of the compensation cell when the compensation cell's carrier coverage of the energy saving service area allows it to be a suitable handover target for the UE. Handover messages 410 for the first UE device 116 are exchanged between the communication stations 108, 112 and handover messages 412 for the nth UE device 116 are exchanged between the communication stations 108, 112. When all of the UE devices 116, 118 are handed over to other cells the energy saving service area 106 is deactivated. As discussed herein, a service area is "deactivated" when it no longer transmits downlink signals to UE devices and does not receive or process uplink signals from UE devices. Therefore, a deactivated service area cannot provide wireless service to UE devices. The communication station that provides the energy saving service area still includes active functions and is not turned off. For example, the communication station is still capable of communicating with other communication stations and/or the network.

In some circumstances, a communication station configuration update message may be sent from the energy saving communication station 112 to other communications stations indicating that the energy saving service area is no longer active. The other communication stations include at least the neighbor stations of the energy saving service area and may include other communication stations that require information regarding the status of the energy saving service area. For example, this functionality could be added to the LTE X2 interface eNB Configuration Update message that communication stations use to notify other communication stations about configuration changes of their service areas (cells).

Also, in some circumstances, a communication station configuration update message may be sent from the compensation communication station 108 to the other communications stations indicating that the compensation service area has been expanded. The other communication stations include at least the neighbor stations of the energy saving service area and the compensation service area and may include other communication stations that require information regarding the status of the compensation service area. For example, this functionality could be added to the LTE X2 interface eNB Configuration Update message that communication stations use to notify other communication stations about configuration changes of their service areas.

Figure 5:
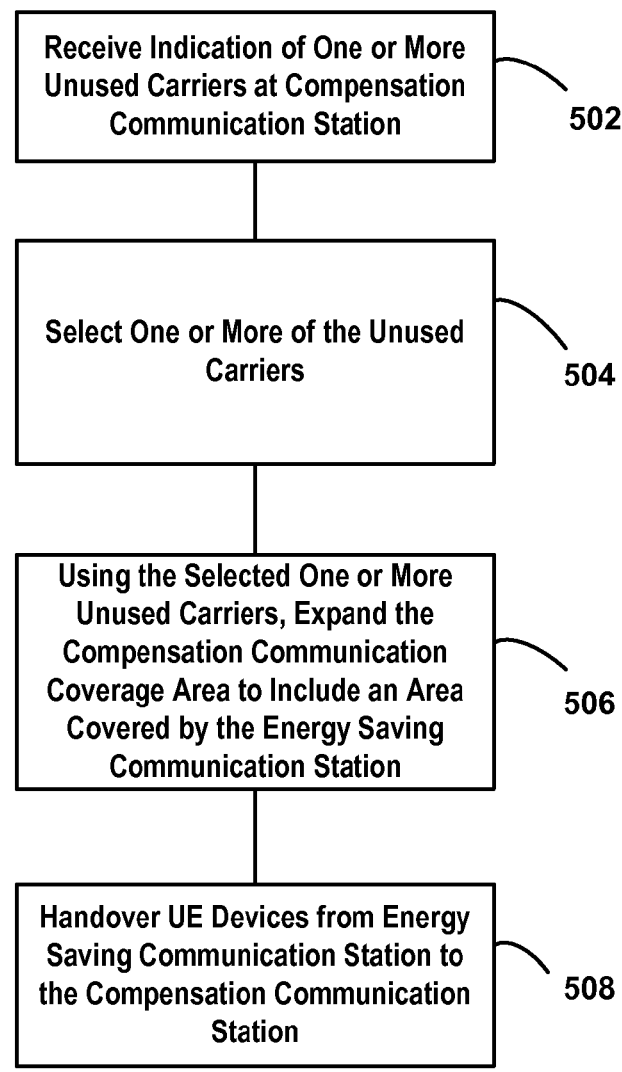
FIG. 5 is a method of operating the system shown in FIG. 1.

FIG. 5 illustrates a method 500 of operating system 100. At step 502, an indication 132 that an energy saving communication station 112 is not using one or more carriers is received at a compensation communication station 108. At step 504, a controller within the compensation communication station 108 selects one or more of the carriers not being used by the energy saving communication station 112.

At step 506, the selected one or more carriers are utilized for expanding a first compensation communication station coverage area 104 to include at least a portion of an area 106 covered by the energy saving communication station 112. More specifically, the energy saving communication station 112 prepares the compensation communication station 108 to expand the compensation cell 104 such that the compensation communication station 108 utilizes the selected one or more carriers for at least the expanded area. At step 508, one or more UE devices are handed over from the energy saving communication station 112 to the compensation communication station 108, as described above. Although not shown in FIG. 5, the energy saving communication station 112 may reduce the amount of energy being used by the energy saving cell 106 after one or more of the UE devices are handed over. The reduction of energy generally includes switching off or deactivating the energy saving cell 106. In other circumstances, the reduction of energy could include: reducing the size of the service area being served by the energy saving cell 106, reducing the broadcast strength of the signals 126, 130 being transmitted by the energy saving communication station 112, and/or reducing the number of UE devices being served by the energy saving cell 106.

In some situations, the energy saving communication station 112 may utilize multiple handover stages to handover the UE devices 116, 118 to one or more compensation communication stations. For example, after completing a first handover stage, as described in steps 502 through 508, the energy saving communication station 112 may transmit an additional indication 132 to the compensation communication station 108 that the energy saving communication station 112 is not using an additional one or more carriers due to handing over at least one of the UE devices 116, 118 from the energy saving communication station 112 to the compensation communication station 108. If the compensation communication station 108 has available capacity to serve one or more of the UE devices 116, 118 being served by the energy saving communication station 112, another handover stage is executed, as described above. This process of using multiple handover stages can repeatedly continue until all of the UE devices 116, 118 of a particular energy saving communication station 112 are handed over.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   receiving, at a compensation communication station, an indication that an energy saving communication station is not using one or more carriers;
   selecting one or more of the carriers not being used by the energy saving communication station;
   utilizing the selected one or more carriers for expanding a first compensation communication station coverage area to include at least a portion of an area covered by the energy saving communication station; and
   handing over at least one of the UE devices from the energy saving communication station to the first compensation communication station.

2. The method of claim 1, wherein expanding the first compensation communication station coverage area comprises:
   expanding the first compensation communication station coverage area to include all of the area covered by the energy saving communication station.

3. The method of claim 1, wherein one or more additional compensation communication stations expand their respective coverage areas to include any portion of the area covered by the energy saving communication station that is not covered by the expanded first compensation communication station coverage area.

4. The method of claim 1, wherein handing over at least one of the UE devices comprises:
   handing over all of the UE devices being served by the energy saving communication station to the first compensation communication station.

5. The method of claim 1, further comprising:
   reducing an amount of energy used by the energy saving communication station.

6. The method of claim 5, wherein reducing the amount of energy used by the energy saving communication station comprises:
   deactivating the energy saving communication station.

7. The method of claim 1, further comprising:
   receiving, at the compensation communication station, an additional indication that the energy saving communication station is not using an additional one or more carriers due to handing over at least one of the UE devices from the energy saving communication station to the first compensation communication station.

8. The method of claim 1, further comprising:
   transmitting a request to initiate a transition of a cell coverage configuration;
   transmitting a response to the request to initiate a transition of the cell coverage configuration; and
   if the response is an acceptance, initiating a transition of the cell coverage configuration.

9. A compensation communication station, comprising:
   a receiver configured to receive:
      an indication that an energy saving communication station is not using one or more carriers, and
      a request from the energy saving communication station to handover one or more user equipment devices (UE devices) from the energy saving communication station to the compensation communication station; and
   a controller configured to:
      select one or more of the carriers not being used by the energy saving communication station,
      utilize the selected one or more carriers for expanding a first compensation communication station coverage area to include at least a portion of an area covered by the energy saving communication station, and
      receive at least one of the UE devices in a handover from the energy saving communication station to the compensation communication station.

10. The compensation communication station of claim 9, wherein the controller is further configured to:
    expand the compensation communication station coverage area to include all of the area covered by the energy saving communication station.

11. The compensation communication station of claim 9, wherein the controller is further configured to:
    receive all of the UE devices being handed over from the energy saving communication station to the compensation communication station.

12. The compensation communication station of claim 9, wherein the receiver is further configured to:
    receive an additional indication that the energy saving communication station is not using an additional one or more carriers due to handing over at least one of the UE devices from the energy saving communication station to the first compensation communication station.

13. A system, comprising:
    an energy saving communication station, comprising:
       a transmitter configured to:
          transmit an indication that the energy saving communication station is not using one or more carriers, and
          transmit a request to handover one or more user equipment devices (UE devices) from the energy saving communication station; and
    a compensation communication station, comprising:
       a controller configured to:
          select one or more of the carriers not being used by the energy saving communication station,
          utilize the selected one or more carriers for expanding a first compensation communication station coverage area to include at least a portion of an area covered by the energy saving communication station, and
          receive at least one of the UE devices in a handover from the energy saving communication station to the compensation communication station.

14. The system of claim 13, wherein the controller is further configured to:
    expand the compensation communication station coverage area to include all of the area covered by the energy saving communication station.

15. The system of claim 13, wherein one or more additional compensation communication stations expand their respective coverage areas to include any portion of the area covered by the energy saving communication station that is not covered by the expanded compensation communication station coverage area.

16. The system of claim 13, wherein the controller is further configured to:
   receive all of the UE devices being handed over from the energy saving communication station to the compensation communication station.

17. The system of claim 13, wherein the energy saving communication station is configured to reduce an amount of energy used by the energy saving communication station after handing over at least one of the UE devices.

18. The system of claim 17, wherein the energy saving communication station is configured to deactivate after handing over at least one of the UE devices.

19. The system of claim 13, wherein the transmitter is further configured to:
   transmit an additional indication that the energy saving communication station is not using an additional one or more carriers due to handing over at least one of the UE devices from the energy saving communication station to the first compensation communication station.

* * * * *